United States Patent
Maki et al.

(10) Patent No.: US 11,807,924 B2
(45) Date of Patent: Nov. 7, 2023

(54) AL PLATED WELDED PIPE FOR HARDENING USE AND AL PLATED HOLLOW MEMBER AND METHOD FOR PRODUCING SAME

(71) Applicant: NIPPON STEEL CORPORATION, Tokyo (JP)

(72) Inventors: Jun Maki, Tokyo (JP); Soshi Fujita, Tokyo (JP); Toyomitsu Nakamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 544 days.

(21) Appl. No.: 16/753,961

(22) PCT Filed: Nov. 20, 2017

(86) PCT No.: PCT/JP2017/041697
§ 371 (c)(1),
(2) Date: Apr. 6, 2020

(87) PCT Pub. No.: WO2019/097729
PCT Pub. Date: May 23, 2019

(65) Prior Publication Data
US 2020/0347489 A1    Nov. 5, 2020

(51) Int. Cl.
*C22C 38/54* (2006.01)
*B23K 11/00* (2006.01)
(Continued)

(52) U.S. Cl.
CPC ............ *C22C 38/54* (2013.01); *B23K 11/002* (2013.01); *B23K 35/0261* (2013.01);
(Continued)

(58) Field of Classification Search
CPC ................ B23K 11/163; B23K 13/046; B23K 2101/06; C21D 9/08; C22C 38/00;
(Continued)

(56) References Cited

U.S. PATENT DOCUMENTS

| 2012/0073351 A1 | 3/2012 | Maki et al. |
| 2014/0030544 A1 | 1/2014 | Maki et al. |

(Continued)

FOREIGN PATENT DOCUMENTS

| CN | 103492605 A | 1/2014 |
| JP | 2000-38640 A | 2/2000 |

(Continued)

*Primary Examiner* — Jie Yang
(74) *Attorney, Agent, or Firm* — Birch, Stewart, Kolasch & Birch, LLP

(57) ABSTRACT

An Al plated electric resistance welded steel pipe for hardening use suppressing the formation of scale to the inside of the plating layer while performing hot forming and an Al plated hollow member using that Al plated electric resistance welded steel pipe, wherein the Al plated electric resistance welded steel pipe for hardening use is comprised of a base material made of a tubular steel plate and having a predetermined chemical composition and an electric resistance welded zone provided at a seam portion of the steel plate and extending in a longitudinal direction of the steel plate, the base material is further provided with an intermetallic compound layer positioned on the surface of the steel plate and including an Al—Fe—Si-based intermetallic compound and an Al plating layer positioned on the surface of the intermetallic compound layer and containing Al and Si, and $70 \times X/D \leq Y/t \leq 30$ is satisfied, wherein X (μm) is a thickness of the intermetallic compound layer, Y (μm) is a thickness of the Al plating layer, t (mm) is a pipe thickness of the steel pipe, and D (mm) is an outside diameter of the steel pipe.

4 Claims, 1 Drawing Sheet

SCALE PART (5 μm WIDTH)

(51) Int. Cl.
    B23K 35/02    (2006.01)
    B23K 35/30    (2006.01)
    C21D 9/08     (2006.01)
    C22C 38/00    (2006.01)
    C22C 38/02    (2006.01)
    C22C 38/06    (2006.01)
    C22C 38/42    (2006.01)
    C22C 38/44    (2006.01)
    C22C 38/48    (2006.01)
    C22C 38/50    (2006.01)
    C25D 3/44     (2006.01)
    C25D 7/04     (2006.01)
    B23K 103/04   (2006.01)
    B23K 101/06   (2006.01)

(52) U.S. Cl.
    CPC ............ *B23K 35/3053* (2013.01); *C21D 9/08* (2013.01); *C22C 38/001* (2013.01); *C22C 38/002* (2013.01); *C22C 38/02* (2013.01); *C22C 38/06* (2013.01); *C22C 38/42* (2013.01); *C22C 38/44* (2013.01); *C22C 38/48* (2013.01); *C22C 38/50* (2013.01); *C25D 3/44* (2013.01); *C25D 7/04* (2013.01); *B23K 2101/06* (2018.08); *B23K 2103/04* (2018.08)

(58) Field of Classification Search
    CPC .. C23C 28/00; C23C 2/12; C23C 2/38; C25D 3/44; C25D 7/04
    USPC ......................................................... 420/105
    See application file for complete search history.

(56) References Cited

U.S. PATENT DOCUMENTS

| | | |
|---|---|---|
| 2017/0313028 A1 | 11/2017 | Kawata et al. |
| 2017/0362678 A1* | 12/2017 | Goto ..................... B21C 37/08 |
| 2018/0044747 A1* | 2/2018 | Valdez ................... C21D 6/004 |

FOREIGN PATENT DOCUMENTS

| | | |
|---|---|---|
| JP | 2006-16674 A | 1/2006 |
| JP | 2008-69398 A | 3/2008 |
| JP | 2014-118628 A | 6/2014 |
| TW | I564404 B | 1/2017 |
| WO | WO 2009/131233 A1 | 10/2009 |

* cited by examiner

AL PLATED WELDED PIPE FOR HARDENING USE AND AL PLATED HOLLOW MEMBER AND METHOD FOR PRODUCING SAME

FIELD

The present invention relates to an Al plated welded pipe for hardening use, a method for producing a hot press worked Al plated hollow member, and an Al plated hollow member.

BACKGROUND

In recent years, to protect the environment and suppress global warming, there have been increasing calls for keeping down the consumption of fossil fuels. These calls have been impacting various manufacturing industries. For example, automobiles, which are essential as means for transport in daily life and activity, are no exception either. Improvement of fuel economy through reducing the weight of car bodies etc. are being sought. However, in automobiles, not only just reducing the weight of car bodies, but also securing the required strength and suitable safety is necessary.

Much of the structure of automobiles is formed by steel. Reduction of the mass of this steel is important for reducing the weight of car bodies. In particular, steel pipes are closed structures, so high rigidity is obtained, therefore in recent years, use as structural members of automobiles has been increasing. As the method for working steel pipe into a member, cold bending and hydroforming have been used in the past, but in recent years, the method of hot bending in three dimensions, then immediately water cooling and working the high strength hollow member has been proposed.

In this hot bending method, the material to be formed is heated once to a high temperature (austenite region), the steel pipe softened by the heating is formed by bending, then the steel pipe is cooled. Due to this hot bending method, the material is heated once to a high temperature to make it soften, so the material can be easily bent and, furthermore, the material can be raised in mechanical strength due to the effect of hardening by cooling after forming. As a result, a formed article achieving both a complicated shape and high mechanical strength can be obtained.

When applying the hot bending method to steel pipe, for example, due to heating to a high temperature of 800° C. or more, the iron at the surface etc. oxidizes and scale (oxides) is formed. Therefore, after hot press working, a step of removing the scale (descaling step) becomes necessary and the productivity falls. Further, in a member requiring corrosion resistance etc., after working, it is necessary to treat the surface of the member to prevent rusting or to cover it by metal. A surface cleaning step and surface treatment step become necessary and again the productivity falls. In particular, in the case of a steel pipe shape, descaling the inside surface side is difficult.

As one example of the method for suppressing such a drop in productivity, the method of covering the steel may be mentioned. If using welded steel pipe, the pipe is produced by forming and seam welding the plated steel plate, so the productivity of the plated steel plate is affected. For example, a galvanized coating with a sacrificial corrosion prevention action is being broadly used from the viewpoints of the corrosion prevention performance and steel plate production technique.

However, the heating temperature at hot forming (800 to 1000° C.) is higher than the temperature of decomposition of organic materials, the boiling point of Zn, etc. When heated in hot forming, sometimes the plating layer at the surface evaporates and causes remarkable deterioration of the surface properties. Therefore, for steel plate heated to a high temperature and hot press worked, for example, it is desirable to use steel plate covered with an Al-based metal as such a covering does not react to decompose like a covering of an organic material and has a higher boiling point than a Zn-based metal covering (so-called "Al plated steel plate").

By applying an Al-based metal covering, it is possible to prevent deposition of scale on the steel surface. As a result, a descaling step or other step becomes unnecessary, so the productivity is improved. Further, an Al-based metal covering also has a rust proofing effect, so the corrosion resistance is also improved after coating.

PTL 1 describes a method of using an Al plated steel plate obtained by covering steel having predetermined steel constituents with an Al-based metal covering for hot press working.

PTL 2 discloses the art of suppressing the formation of scale at the inside of a plating layer in steel plate for hot press working use.

PTL 3 discloses a method of forming Al plated steel plate into a steel pipe shape, welding the seam, then heating, forming, and hardening the steel pipe to obtain a high strength member.

PTL 4 discloses a heat treated steel material obtained by heat treating a steel material covered by an Al-based plating layer. In the examples, an example of an Al plated steel plate formed into a steel pipe with an outside diameter of 31.8 mm and a wall thickness of 1.2 mm by a UO process and bending it is disclosed.

CITATIONS LIST

Patent Literature

[PTL 1] Japanese Unexamined Patent Publication No. 2000-38640
[PTL 2] Japanese Unexamined Patent Publication No. 2014-118628
[PTL 3] Japanese Unexamined Patent Publication No. 2006-16674
[PTL 4] Japanese Unexamined Patent Publication No. 2008-69398

SUMMARY

Technical Problem

As explained above, as structural members for automobiles, Al plated steel plates have increasingly been formed into steel pipes which are then worked. For this reason, use of high productivity electric resistance welded steel pipe has been sought. Further, from the viewpoint of the strength of the structural member, use of steel pipe with a large plate thickness has been sought. That is, when the plate thickness is "t" and the outside diameter of the steel pipe is D, steel pipe with a large t/D has to be worked.

As a problem to consider when forming an Al plated steel plate into an electric resistance welded steel pipe, then hot forming and hardening it, the formation of cracks in the alloy layer at the time of forming the electric resistance welded steel pipe and the formation of iron oxides (scales) inside the plating layer due to the cracks may be mentioned.

Cracks form at the Al—Fe—Si-based alloy layer at the interface of the steel plate and Al-plating layer distorted at the time of forming the Al plated steel plate into a steel pipe shape. An Al—Fe—Si-based alloy layer is extremely hard and brittle, so when forming steel plate into a steel pipe shape, the alloy layer is partially destroyed and cracks form. Further, the cracks formed act as starting points for oxidation of steel plate since the oxygen in the air cannot be blocked by the plating layer at the time of heating whereby iron oxides (scale) are formed at the inside of the plating layer.

In PTL 2, the thickness of the alloy layer and the thickness of the plating layer are prescribed to suppress the formation of iron oxides (scale). PTL 2 takes note of the cracks in the Al plated steel plate for hot stamping use and discloses the art of reducing the cracks in the intermetallic compound layer in the C direction (direction perpendicular to rolling direction).

However, in the case of an electric resistance welded steel pipe, the forming strain generally tends to be larger than steel plate or steel pipe shaped by a UO process. This is because, for example, sometimes rebending is performed when producing pipe and there is a step of imparting compression distortion in the circumferential direction in the subsequent fin pass and squeeze step. Further, the main distortion in the process of forming steel pipe is in the C direction, so cracks proceed in the L direction (rolling direction). If t/D is large, the distortion becomes further larger and cracks easily form. That is, the problem of the formation of scale at the time of heating starting from these cracks occurs more easily compared with hot forming steel plate or UO steel pipe.

Furthermore, the inventors discovered that when electric resistance welding Al plated steel plate, since the melting point of Al is low, due to the effect of the molten Al, electric resistance welding becomes harder compared with other steel plate and that if good electric resistance welding is not performed, the welded zone can become the starting point of formation of scale.

That is, when electric resistance welding an Al plated steel plate and hot forming it to produce a structural member, special measures considering these become necessary.

The present invention was made in consideration of the above problem and has as its object to form Al plated steel plate to obtain electric resistance welded steel pipe and provide Al plated electric resistance welded steel pipe for hardening use able to suppress the formation of scale at the inside of a plating layer while hot press working it, a method for producing a hot formed Al plated hollow member using such an Al plated electric resistance welded steel pipe for hardening use, and an Al plated hollow member.

Solution to Problem

The inventors engaged in repeated intensive studies and as a result discovered that in addition to the thickness of the alloy layer and thickness of the plating layer, the plate thickness and the outside diameter of the steel pipe play important roles in suppressing the formation of scale. Further, they discovered that for good electric resistance welding and suppression of formation of scale, the relationship between the thickness of the plating layer and the plate thickness is important.

The present invention was completed based on the above finding and has as its gist the following:

[1] An Al plated electric resistance welded steel pipe for hardening use comprising a base material made of a tubular steel plate and an electric resistance welded zone provided at a seam portion of the steel plate and extending in a longitudinal direction of the steel plate, the base material comprising, by mass %, C: 0.06 to 0.50%, Si: 0.01 to 0.80%, Mn: 0.60 to 3.00%, P: 0.050% or less, S: 0.050% or less, Al: 0.10% or less, O: 0.006% or less, N: 0.020% or less, Ti: 0.01 to 0.10%, B: 0 to 0.1000%, Nb: 0 to 0.10%, V: 0 to 0.30%, Cr: 0 to 0.50%, Mo: 0 to 0.50%, Ni: 0 to 0.50%, Cu: 0 to 0.50%, Ca: 0. to 0.005%, REM: 0 to 0.005% and a balance of Fe and impurities, the base material comprising an intermetallic compound layer positioned on the surface of the steel plate and including an Al—Fe—Si-based intermetallic compound and an Al plating layer positioned on the surface of the intermetallic compound layer and containing Al and Si, wherein $70 \times X/D \leq Y/t \leq 30$ is satisfied, wherein X (μm) is a thickness of the intermetallic compound layer, Y (μm) is a thickness of the Al plating layer, t (mm) is a pipe thickness of the steel pipe, and D (mm) is an outside diameter of the steel pipe.

[2] The Al plated electric resistance welded steel pipe for hardening use according to [1], wherein $X \leq 5.0$ $Y \leq 32$ μm, and $4.0 \leq Y/X \leq 6.0$ are satisfied.

[3] The Al plated electric resistance welded steel pipe for hardening use according to [1] or [2], wherein the surface of the Al plating layer is further provided with a film mainly comprised of ZnO and the amount of deposition of the film is, by amount of Zn, 0.1 to 1 g/m$^2$.

[4] The Al plated electric resistance welded steel pipe for hardening use according to any one of [1] to [3] wherein the welded zone is covered by an alloy mainly comprised of Al.

[5] The Al plated electric resistance welded steel pipe for hardening use according to any one of [1] to [4] wherein $2\% \leq t/D \leq 10\%$ is satisfied.

[6] An Al plated hollow member comprising: an electric resistance welded pipe comprising a base material made of a tubular steel plate and an electric resistance welded zone provided at a seam portion of the steel plate and extending in a longitudinal direction of the steel plate, the base material comprising, by mass %, C: 0.06 to 0.50%, Si: 0.01 to 0.80%, Mn: 0.60 to 3.00%, P: 0.050% or less, S: 0.050% or less, Al: 0.10% or less, O: 0.006% or less, N: 0.020% or less, Ti: 0.01 to 0.10%, B: 0 to 0.1000%, Nb: 0 to 0.10%, V: 0 to 0.30%, Cr: 0 to 0.50%, Mo: 0 to 0.50%, Ni: 0 to 0.50%, Cu: 0 to 0.50%, Ca: 0. to 0.005%, REM: 0 to 0.005% and a balance of Fe and impurities; and an alloy layer positioned on the surface of the electric resistance welded steel pipe and containing at least one of an Al—Fe-based alloy and Al—Fe—Si-based alloy, wherein a rate of formation of Fe oxide scale in the alloy layer is 5% or less, and a Vickers hardness Hv of a steel base material of the electric resistance welded pipe is 350 to 800.

[7] The Al plated hollow member according to [6], wherein there is no Al not alloyed remaining in the alloy layer.

[8] The Al plated hollow member according to [6] or [7], wherein the surface of the alloy layer is further provided with a film mainly comprised of ZnO, and the amount of deposition of the film is, by amount of Zn, 0.1 to 1 g/m$^2$.

[9] A method for producing an Al plated hollow member comprising: a heating step of heating by a heating temperature of 850° C. or more an Al plated electric resistance welded steel pipe for hardening use comprising a base material made of a tubular steel plate and an electric resistance welded zone provided at a seam portion of the steel plate and extending in a longitudinal direction of the steel plate, wherein the base material contains, by mass %, C: 0.06 to 0.50%, Si: 0.01 to 0.80%, Mn: 0.60 to 3.00%, P: 0.050% or less, S: 0.050% or less, Al: 0.10% or less, O: 0.006% or less, N: 0.020% or less, Ti: 0.01 to 0.10%, B: 0 to 0.1000%, Nb: 0 to 0.10%, V: 0 to 0.30%, Cr: 0 to 0.50%, Mo: 0 to 0.50%, Ni: 0 to 0.50%, Cu: 0 to 0.50%, Ca: 0. to 0.005%, REM: 0 to 0.005% and a balance of Fe and impurities, and the base material is further provided with an intermetallic compound layer positioned on the surface of the steel plate and including an Al—Fe—Si-based intermetallic compound and an Al plating layer positioned on the surface of the intermetallic compound layer and containing Al and Si; a forming step of forming the heated Al plated electric resistance welded steel pipe for hardening use into a desired shape; and a rapid cooling step of rapid cooling the Al plated electric resistance welded steel pipe for hardening use formed into the desired shape by an average cooling rate of 20° C./s or more, wherein the following formula (1) and formula (2) are satisfied, wherein X (μm) is a thickness of the intermetallic compound layer, Y (μm) is a thickness of the Al plating layer, t (μm) is a pipe thickness of the steel pipe, D (mm) is an outside diameter of the steel pipe, and HR (° C./s) is an average rate of temperature rise from ordinary temperature to a peak temperature −50° C. set at the time of hot forming:

$$Y/X \geq \alpha \times t/D \quad (1)$$

$$\alpha = 168 \times HR^{-0.45} \quad (2)$$

Advantageous Effects of Invention

According to the present invention, steel pipe obtained by forming Al plated steel plate can be protected from formation of scale to the inside of the plating layer while being hot press worked, the steel pipe can be quenched, and an Al plated hollow member can be produced using the Al plated steel pipe as a matrix material.

DESCRIPTION OF EMBODIMENTS

Figure 1:
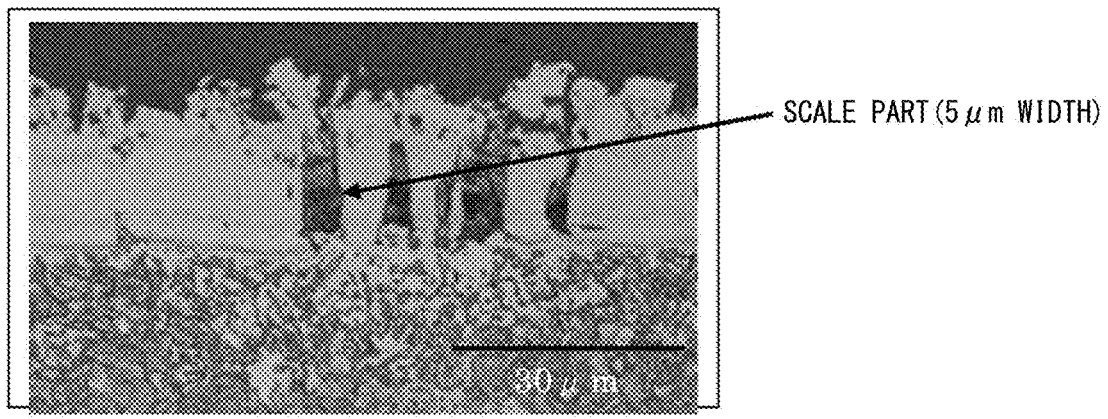
FIG. 1 is a photograph of a cross-section of scale in an alloy layer of a hot press worked Al plated hollow member.

Below, preferred embodiments of the present invention will be explained in detail.

Before explaining the Al plated electric resistance welded steel pipe for hardening use, the method for producing an Al plated hollow member, and the hot press worked Al plated hollow member according to embodiments of the present invention, first the details of the studies conducted by the inventors to solve the problem will be explained.

The cracks when forming plate into an electric resistance welded steel pipe depend on the distortion at the time of forming. The distortion at the time of forming can be substantially dealt with by focusing on the parameter t/D expressing the amount of distortion when the plate thickness is "t" mm and the outside diameter of the pipe is D mm. If considering reduction of the amount of cracks of the alloy layer when receiving this distortion, even if cracks form in the alloy layer, cracks are repaired in the heating process if the Al plating layer present at the layer above the alloy layer is sufficiently thick.

The inventors studied this and as a result discovered that when denoting the thickness of the Al plating layer as Y (μm) and the thickness of the alloy layer (thickness of intermetallic compound layer) as X (μm), the larger the parameter Y/X expressing the ratio of the thicknesses of the layers, the greater the resistance to the formation of scale due to cracks and therefore this problem can be solved by focusing on the relationship between the two parameters (t/D) and (Y/X).

Further, they discovered that since the melting point of Al is low, Al plated steel plate is more difficult to weld by electric resistance welding than other steel plate due to the effect of molten Al and that to perform good electric resistance welding, it is necessary to make (Y/t) a suitable range.

Furthermore, the inventors studied this and as a result obtained the discovery that even the rate of temperature rise of steel pipe at the time of hot press working has a great effect on the formation of scale. They thought that when making the average rate of temperature rise from ordinary temperature to the peak temperature-50° C. HR (° C./s), it is important to make the function of HR, that is, the product of α and (t/D), larger than (Y/X). By satisfaction of this relationship, even if heating the Al plated steel pipe to 900° C. or so, it becomes possible to suppress the formation of scale at the inside of the plating layer. This embodiment of the present invention was completed based on the above such discovery.

The reason why the rate of temperature rise affects the formation of scale inside of the plating layer is believed to be as follows:

Due to the heating at the time of hot press working, the constituents of the Al plating and the constituents of the steel pipe mutually diffuse and the alloy layer grows. If cracks form in the alloy layer, the growth of the alloy layer acts in a direction repairing the cracks. However, if the cracks formed are too large, the cracks cannot be repaired. As a result, if the cracks reach the surface of the Al plating, the steel pipe is oxidized by the oxygen in the atmosphere.

If rapidly heating Al plated steel pipe, the Al plating layer becomes a liquid phase at about 600° C. This liquid phase enters inside the cracks whereby repair of the cracks is promoted. Rapid heating is treatment facilitating the formation of liquid phase Al. It can be understood that due to rapid heating, the crack repair action due to the liquid phase Al becomes greater.

Note that, the value of (Y/X) divided by (t/D) is expressed as α in the present embodiment and α is defined as $168 \times HR^{-0.68}$. This definition was calculated from experiments by the inventors.

Below, the Al plated electric resistance welded steel pipe for hardening use, the method for producing an Al plated hollow member, and the hot press worked Al plated hollow member according to embodiments of the present invention will be explained. Below, "%" means "mass %".

Regarding Al Plated Steel Plate

The Al plated welded pipe for hardening use according to the present embodiment is obtained by forming the Al plated steel plate to an open tubular shape and seam welding the seam portion to obtain a steel pipe shape. As the seam welding, electric resistance welding is preferable.

The Al plated steel plate used in the present embodiment is formed with an Al plating layer containing Al on one side or both sides of the steel plate. Further, the Al plating layer may be further provided with a surface film layer containing at least ZnO.

Regarding Steel Plate

As the steel plate used for the Al plated steel plate, steel plate designed to have a high mechanical strength after hot press working (for example, meaning tensile strength, yield point, elongation, drawability, hardness, impact value, fatigue strength, creep strength, and other properties relating to mechanical deformation and fracture) is preferably used.

One example of the constituents of the steel plate for realizing a high mechanical strength able to be used in one embodiment of the present invention will be explained below:

C: 0.06 to 0.50%

C is an element included for securing the target mechanical strength. If the content of C is less than 0.06%, a sufficient improvement in mechanical strength cannot be obtained and the effect of inclusion of C becomes poorer. Furthermore, it is not possible to make the hardness one of Hv350 or more by hardening after hot bending. If the content of C is over 0.50%, it is possible to further harden the steel plate, but hot cracking easily occurs. Therefore, the content of C is preferably, by mass %, 0.06% to 0.50%.

Si: 0.01 to 0.80%

Si is an element used for deoxidation. Furthermore, it is one of the strength increasing elements improving the mechanical strength. Like C, it is included for securing the targeted mechanical strength. If the content of Si is less than 0.01%, there is the possibility of the deoxidation not sufficiently occurring, the effect of improvement of strength becomes difficult to achieve, and a sufficient improvement of mechanical strength cannot be obtained. On the other hand, Si is also an oxyphile element. Accordingly, if the content of Si is over 0.80%, the wettability at the time of hot dip Al coating falls and uneven plating is liable to occur. Therefore, the content of Si is preferably, by mass %, 0.01% to 0.80%.

Mn: 0.60 to 3.00%

Mn is one of the strengthening elements for strengthening steel. It is also one of the elements for raising the hardenability. Furthermore, Mn is an element effective for preventing hot brittleness by one of the impurities of S. If the content of Mn is less than 0.60%, these effects cannot be obtained. The above effect is exhibited at 0.60% or more. On the other hand, if the content of Mn is over 3.00%, the residual γ phase becomes too great and the strength is liable to fall. Therefore, the content of Mn is preferably a mass % of 0.60% to 3.00%.

P: 0.050% or Less

P is an impurity and precipitates at the grain boundaries to cause a part to become brittle, so the content is preferably small or is made 0.050% or less. It is difficult to make the content completely 0. The realistic lower limit is 0.001%.

S: 0.050% or Less

S is an impurity element forming MnS and other nonmetallic inclusions. The nonmetallic inclusions form starting points for cracking at the time of cold working, so the smaller the content of S, the more preferable. 0.050% or less is preferable. The lower the content of S, the better, but if reduced to less than 0.001%, the refining costs greatly rise, so if considering the refining costs, the content may be 0.001% or more.

Al: 0.10% or Less

Al is an element used as a deoxidizer. It does not have to be included in the steel after deoxidation, but usually 0.0003% or more of Al remains and is included in the steel. If the content of Al is over 0.10%, a large amount of inclusions are formed and the workability falls, so 0.10% or less is preferable.

O: 0.006% or Less

O forms coarse oxides in steel if included in a large amount, so a smaller amount is preferable. Making it 0.006% or less is preferable. The lower the content of O the better, but if reducing the content to less than 0.001%, the refining costs greatly rise, so if considering the refining costs, the content may be 0.001% or more.

N: 0.020% or Less

N is an impurity and an element effective for improvement of strength. Making the content of N 0.001% requires large costs, so the content may be made 0.001% or more. If the content of N becomes great, the ductility and toughness deteriorate, so the content is made 0.020% or less.

Ti: 0.01 to 0.10%

Ti has the effect of improving the strength of the steel and suppressing surface defects of the Al plating and the effect of suppression of deterioration of the oxidation resistance when surface defects form. To obtain these effects, the content is made 0.01% or more. If the content is over 0.10%, coarse Ti nitrides are formed and the formability falls, so the content is made 0.10% or less.

B: 0.1000% or Less

B is an element which acts at the time of hardening and has the effect of increasing the strength and can be included in accordance with need. To effectively obtain the effect of increasing the strength, the content of B is preferably made 0.0003% or more. On the other hand, if the content of B is over 0.1000%, inclusions are formed causing brittleness and are liable to cause the fatigue strength to fall, so the content is made 0.1000% or less, preferably is made 0.0060% or less.

Nb: 0 to 0.10%

Nb raises the recrystallization temperature and forms carbonitrides to make the steel finer grained. To obtain these effects, inclusion in 0.01% or more is preferable. If the content is over 0.10%, due to the effect of precipitation, the low temperature toughness is sometimes impaired, so the content is made 0.10% or less.

V: 0 to 0.30%

V is an element which forms carbonitrides to improve the strength and can be included in accordance with need. To effectively obtain the effect of improvement of strength, inclusion of 0.01% or more is preferable. If the content is over 0.30%, the steel plate falls in workability, so the content is made 0.30% or less.

Cr: 0 to 0.50%

Cr is an element effective for hardenability in the same way as Mn and can be included in accordance with need. To effectively obtain the effect of improvement of hardenability, inclusion of 0.01% or more of Cr is preferable. If the content of Cr is over 0.50%, the carbides stabilize at the time of rapid heating. At the time of hardening, the carbides slowly dissolve and the required hardened strength is liable to be unable to be achieved, so the content is made 0.50% or less.

Mo: 0 to 0.50%

Mo is an element improving the hardenability and can be included in accordance with need. To effectively obtain the effect of improvement of the hardenability, inclusion of 0.01% or more is preferable. If the content is over 0.50%, the heat resistance of the Al plating falls, so the content is made 0.50% or less.

Ni: 0 to 0.50%

Ni is an element effective for improving the toughness and can be included in accordance with need. To effectively obtain the effect of addition, Ni is preferably made 0.001% or more. If the content of Ni is over 0.50%, the workability falls, so Ni is made 0.50% or less.

Cu: 0 to 0.50%

Cu is an element improving the hardenability and contributing to improvement of the strength and can be included in accordance with need. To effectively obtain the effect of addition, Cu is preferably made 0.001% or more. If the content of Cu is over 0.50%, there is a possibility of causing the formation of defects at the time of hot rolling, so Cu is preferably made 0.50% or less.

Ca: 0 to 0.005%

Ca is an element which can control the form of the sulfides by addition in a trace amount and can be included in accordance with need. To effectively obtain the effect of addition, Ca is preferably made 0.001% or more. If the content of Ca is over 0.005%, coarse Ca oxides are formed and become starting points for cracking at the time of working, so Ca is made 0.005% or less.

REM: 0 to 0.005%

REM is an element effective for improvement of the formability and can be included in accordance with need. To effectively obtain the effect of addition, the content of REM is preferably made 0.001% or more. If the content of REM becomes greater, the ductility is liable to be impaired, so the content is made 0.005% or less.

When forming Al plated steel plate to steel pipe, bending and welding are necessary. The end parts of the bent Al plated steel plate sometimes are stripped of plating to facilitate electric resistance welding. Furthermore, the weld bead formed by the electric resistance welding is cut off. Therefore, there is no Al plating layer at the seam welded zone. Therefore, to prevent oxidation and decarburization from the welded zone and avoid the possibility of the welded pipe being corroded during use, sometimes Al etc. is sprayed. By spraying metal containing Al etc., it becomes possible to suppress oxidation and decarburization from the welded zone to a certain extent.

The adhesion between the sprayed metal and weld bead is affected by P, N, and Al. If spraying Al etc., the contents of P, N, and Al in the steel plate are preferably made further lower than those explained above. They are particularly preferably made respectively P: 0.01% or less, N: 0.006% or less, and Al: 0.08% or less. If using steel plate containing P, N, and Al in the above contents or more, the adhesion of a repaired sprayed part falls and the sprayed part ends up peeling off due to a temperature rise in the later step of hot press working.

The balance of the steel plate is Fe and unavoidable impurities. The "unavoidable impurities" means constituents contained in the raw material or entering in the process of production and not intentionally included in the steel. Specifically, P, S, O, N, Sb, Sn, W, Co, As, Mg, Pb, Bi, and H may be mentioned.

P, S, O, and N have to be controlled in contents to the above ranges. For the other elements, usually Sb, Sn, W, Co, and As may be included as unavoidable impurities in 0.1% or less, Mg, Pb, and Bi in 0.005% or less, and H in 0.0005% or less, but do not have to be particularly controlled so long as in the usual ranges.

The steel plate formed by such constituents is plated with Al, formed into a steel pipe shape, then heated and worked by hot press working or hot bending (below, referred to together as the "hot forming") etc., then cooled by a press die, cooled by water, air-water, a gas, or other medium, quenched, and given a mechanical strength of a tensile strength of about 1500 MPa or more. While being steel pipe having a high mechanical strength in this way, if worked by a hot forming method, it can be worked in a state softened by heating, so can be easily formed. Further, the steel pipe can realize high mechanical strength and in turn can maintain or improve the mechanical strength even if made thinner to lighten the weight.

Regarding Al Plating Layer

The Al plating layer is formed on one side or both sides of the steel plate. The Al plating layer is, for example, formed on the surface of the steel plate by hot dip coating. The method of forming the Al plating layer according to the present embodiment is not limited to hot dip coating. A known Al plating method such as electroplating etc. may be utilized.

As the constituents of the Al plating layer, Al is preferably contained in 70% or more, more preferably 80% or more. Further, Si is contained. That is, the Al plating layer according to the present embodiment is a plating layer comprised of Al—Si.

If the Al plating layer contains Si, it is possible to control the alloy layer formed at the time of covering by the hot dip coating metal. If the content of Si is less than 3%, the Fe—Al alloy layer grows thicker at the stage of applying the Al plating and cracks may be formed at the time of forming the steel pipe to detrimentally affect the corrosion resistance. On the other hand, if the content of Si is over 15%, the workability of the plating layer and the corrosion resistance are liable to fall. Therefore, the content of Si is preferably 3% to 15%.

If using hot dip coating to form the Al plating layer, as the element other than Si, sometimes Fe eluted from the equipment in the bath or steel strip is contained in an amount of 2 to 4%. Further, in addition to this Fe, the Al plating bath may contain at least one of Mg, Ca, Sr, and Li in amounts of about 0.01 to 1%.

Regarding Intermetallic Compound Layer

If forming an Al plating layer such as explained above on the surface of the steel plate explained above, the constituents of the steel plate and the constituents of the Al plating layer are mutually diffused between the steel plate and the Al plating layer whereby an intermetallic compound layer containing an intermetallic compound made of an Al—Fe—Si-based alloy is formed. The thickness of the intermetallic compound layer is determined depending on the bath temperature at the time of Al plating, the plate running speed, the steel constituents, etc., but for example becomes a range of about 3 μm to 8 μm.

The constituents of the intermetallic compound layer usually include, by mass %, Al: 35 to 65% and Si: 3 to 15% and a balance of Fe and impurities.

Regarding Method of Measurement of Thicknesses of Al Plating Layer and Intermetallic Compound Layer The thicknesses of the Al plating layer and intermetallic compound layer can be measured by various known measurement methods. For example, the cross-section of the Al plated steel plate before forming into steel pipe or the Al plated welded pipe can be observed under an optical microscope or scanning electron microscope etc. for measuring the thicknesses.

Specifically, the cross-section of the Al plated steel plate or Al plated welded pipe is observed at a plurality of fields under suitable power. The thicknesses of the Al plating layer and intermetallic compound layer in each field are measured. After that, by taking the average of the measured values obtained from the measured fields, it is possible to obtain the thicknesses of the Al plating layer and intermetallic compound layer.

Regarding Surface Film Layer

The Al plated steel plate may further have a surface film layer superposed on the surface of the Al plating layer. The surface film layer preferably contains at least ZnO. By using a solution of particulates of ZnO suspended in an aqueous solution and coating this suspension by a roll coater etc. and drying it, it is possible to form a surface film layer. This surface film layer has the effect of improving the lubricating ability at the time of hot forming and the reactivity with the phosphating solution.

The surface film layer may contain, as a constituent other than ZnO, for example an organic binder constituent. As the organic binder, for example, a polyurethane-based resin, polyester-based resin, acrylic-based resin, silane coupling agent, or other water soluble resin may be mentioned. Further, the surface film layer may be made to contain oxides other than ZnO (for example, $SiO_2$, $TiO_2$, $Al_2O_3$, etc.).

As the method of forming such a surface film layer containing the binder constituent, for example, the method of mixing a suspension containing ZnO with a predetermined organic binder and coating them on the surface of the Al plating layer, the method of coating by a powder coating, etc. may be mentioned.

The amount of deposition of the surface film layer containing ZnO is preferably, by conversion to amount of Zn, 0.1 to 1 $g/m^2$ per side of the steel plate. If the content of ZnO is, by amount of Zn, 0.1 $g/m^2$ or more, the effect of improvement of the coating adhesion, the effect of improvement of lubrication, etc. can be effectively manifested. On the other hand, if the content of ZnO is over 1 $g/m^2$ as Zn, more than the necessary film is imparted, so this lacks economic rationality. In the high strength steel pipe parts used in automobiles etc., since there is low possibility of the inside surfaces of the steel pipe parts being exposed to a corrosive atmosphere, the surface film layer containing ZnO can also be imparted to just the side of the steel pipe part becoming the outer side.

The method of formation of the surface film layer is not limited to the above example. Various known methods may be used for formation.

When forming an Al plated steel plate having a surface film layer into a steel pipe, at the time of forming, there is a possibility that the surface film layer will partially peel away or be removed. To avoid this, the surface film layer may be formed after forming the steel pipe. The surface film layer can be formed after forming the steel pipe by immersing the steel pipe in the suspension or by spraying the suspension on or by another method.

Regarding Production of Steel Pipe

In the present embodiment, the Al plated steel plate is worked into an open pipe shape, then the two ends are heated, pressed together, and electric resistance welded to produce a pipe and obtain an Al plated welded pipe. As the electric resistance welding, high frequency welding is often used. Usually, preferably the plating layer at the portion becoming the weld bead is removed in advance by grinding etc. and then the welding is performed. Further, to flatten the weld bead after welding, cutting or other machining is preferably used.

Furthermore, the weld bead is not covered by the plating, so sometimes is subjected to surface oxidation at the time of the subsequent hot forming and decarburization from the surface accompanying the same and the corrosion etc. at the time of use. To avoid this, metal containing Al may be sprayed on the weld bead to form a sprayed coating on the weld bead. Here, as the metal containing the Al, pure Al, Al—Zn, Al—Si, Al—Mg, etc. can be mentioned. Al is excellent in heat resistance, so is excellent in protectiveness at the time of hot forming. The thickness of the sprayed coating thickness at this time is, for example, preferably 5 to 100 μm. The spraying is performed on the outside surface of the steel pipe.

The diameter of the steel pipe is often usually 20 to 70 mm or so, but is not particularly limited. Note that, the Al plated hollow member of the present embodiment is obtained after hot forming the Al plated welded pipe, so it is difficult to find the accurate steel pipe diameter and plate thickness in the steel pipe state from the Al plated hollow member. Therefore, in the present embodiment, the state before hot forming is prescribed.

[Regarding Relationship of Thicknesses of Al Plating Layer and Intermetallic Compound Layer and Amount of Distortion]

The Al plating layer formed by the above such constituents can inhibit oxidation of the steel base material when heating the steel plate and also improves the corrosion resistance. Furthermore, as explained above, the resistance to formation of scale due to cracks can be improved by setting the two parameters (t/D) and (Y/X) to suitable levels. Specifically, by satisfying $70 \times t/D \le Y/X$ ... (1), it is possible to obtain excellent resistance to formation of scale due to cracks. Here, X denotes the thickness of the intermetallic compound layer (alloy layer) (μm), Y denotes the thickness of the Al plating layer (μm), "t" denotes the plate thickness (mm), and D denotes the outside diameter of the steel pipe (mm). Further, the "Al plating layer" means a plating layer containing Al or Al and Si not containing the alloy layer.

Furthermore, as explained above, for good electric resistance welding, (Y/t) must be made a suitable range. Specifically, by satisfying $Y/t \le 30$ ... (2), good electric resistance welding is possible. Due to this, it is possible to keep scale from being formed starting from the welded zone.

If combining formulas (1) and (2), they can be written as $70 \times X/D \le Y/t \le 30$.

As explained above, the larger the Y/X, the greater the resistance to the formation of scale due to cracks. However, as explained above, if the thickness Y of the Al plating layer becomes larger, electric resistance welding becomes difficult. If considering this point, it is preferable to make $X \le 5.0$ (μm), $Y \le 32$ (μm), and $4.0 \le Y/X \le 6.0$.

The Al plated electric resistance welded steel pipe for hardening use of the present invention is not particularly limited in t/D. Provided, however, that if the t/D is large, the distortion at the time of electric resistance welding becomes larger and the formation of scale at the time of hot forming easily becomes a problem, so the present invention is particularly effective for electric resistance welded pipe when the t/D is large, for example, $t/D \ge 2\%$ and $t/D \ge 4\%$. Further, as explained above, if the t/D becomes larger, the forming strain becomes greater, so t/D is preferably 10% or less.

Regarding Working by Hot Forming Method

Next, the case where the Al plated steel pipe (Al plated welded pipe) is worked by the hot forming method will be explained. The working method by hot forming the steel pipe explained below is basically similar to that when hot forming steel plate.

In the hot forming method according to the present embodiment, first, the Al plated steel pipe (Al plated welded pipe) is heated to a high temperature to make it soften. Next, the softened plated steel plate is formed by press working or bending, then the formed plated steel pipe was cooled by the press die or rapidly cooled by water, air-water, gas, or other cooling medium. By making the steel plate soften once in this way, it is possible to easily press work it or bend it. Further, the Al plated steel pipe having the above constituents is hardened by heating and cooling whereby a high mechanical strength of a tensile strength of about 1500 MPa or more is realized.

Here, with the heating at the time of hot forming the Al plated steel pipe (Al plated welded pipe) according to the present embodiment, it is possible to use the system of heating by running the Al plated steel pipe through the inside of an electric furnace or other furnace held at a high temperature. In this case, the Al plating is relatively low in surface emissivity, so the rate of temperature rise is often 4 to 5° C./s. As opposed to this, for example, by applying a near infrared heating furnace or high frequency heating or ohmic heating, it is possible to achieve rapid heating of 15° C./s or more. If considering oxidation and decarburization of the sprayed portion, rapid heating is preferable.

In oxidation of the steel base material, the thickness of the alloy layer and the thickness of the Al plating layer above it have great effects. In addition, this also depends on the formed dimensions of the steel pipe and the rate of temperature rise at the time of heating etc. Therefore, in the present embodiment, as explained above, (Y/X) is made to become α-times or more (t/D). α is 168×HR$^{-0.45}$. HR is the average rate of temperature rise (° C./s) from ordinary temperature to the (peak temperature-50°) C. set at the time of hot forming. That is, the rate of temperature rise is set so as to satisfy the following formula (101) and formula (103).

[Equation 1]

$$\frac{Y}{X} \geq \alpha \cdot \frac{t}{D} \quad (101)$$

$$\alpha = 168 \times HR^{-0.45} \quad (103)$$

If the Al plated welded pipe satisfies the relationships shown by the above formula (101) and formula (103), at the time of the hot forming performed later, cracks formed in the intermetallic compound layer can be suitably repaired and the formation of scale in the plating layer can be inhibited while the Al plated welded pipe is hot formed. On the other hand, if the Al plated welded pipe does not satisfy the relationships shown by the above formula (101) and formula (103), at the time of the hot forming performed later, cracks formed in the intermetallic compound layer cannot be repaired fast enough and scale sometimes forms due to the cracks.

At the time of hot forming the steel pipe, since what is worked is a pipe shaped body, unlike a plate member, heat is removed from one side, so it is difficult to increase the cooling rate. For this reason, it is preferable to introduce a gas inside (fluid with small heat capacities). The inside surface of a steel pipe is difficult to spray, so the gas which is introduced to the inside surface is preferably a nonoxidizing one (for example, nitrogen gas).

After hot forming, the obtained formed article is rapidly cooled. The cooling is usually performed by cooling by the die or cooling by water, air-water, gas, or other cooling medium. The cooling rate (average cooling rate) is made 20° C./s to obtain a high strength member by hardening. Note that, the upper limit value of the cooling rate is not particularly prescribed, but practically it is difficult to make the rate 300° C./s or more. The cooling rate in the rapid cooling by the die is more preferably 30° C./s to 300° C./s.

Regarding Al Plated Hollow Member

The Al plating layer at the Al plated steel pipe (Al plated welded pipe) changes to an alloy layer centered on Al—Fe by the Al plated steel pipe melting at the melting point or more when heated and simultaneously the Al mutually diffusing with Fe. The melting point of the Al—Fe alloy layer is high or about 1150° C. There are several Al—Fe—Si compounds containing Al-Fe or Si. If heated to a high temperature or heated for a long period of time, they transform to compounds with high concentrations of Fe.

The surface condition of the final product, that is, the hot press worked Al plated hollow member, is preferably a state alloyed down to the surface of the Al plating layer in the material Al plated steel pipe (Al plated welded pipe) and having a rate of formation of Fe oxides (scale) in the plating layer formed as a result of the alloying of 5% or less. Further, the more preferable surface condition of the final product hot formed Al plated hollow member is a state alloyed down to the surface of the Al plating layer in the material Al plated steel pipe (Al plated welded pipe) and having no Fe oxides (scale) formed in the plating layer formed as a result of the alloying.

If unalloyed Al remains in the alloy layer of the hollow member, portions where unalloyed Al remains are rapidly corroded and coating blisters extremely easily form in the corrosion resistance after coating, so this is not preferable. Further, if there is 5% or more scale inside of the alloy layer, the surface of the steel pipe is formed with a decarburized layer and the fatigue characteristic is liable to fall. Further, the portion corresponding to the decarburized layer has no plating on it, so the corrosion resistance falls.

If the surface of the Al plating layer of the Al plating layer of the Al plated steel pipe (Al plated welded pipe) used as the material is formed with a surface film layer comprised mainly of ZnO, the alloy layer of the final product Al plated hollow member also has a surface film layer comprised mainly of ZnO present on it. Further, after producing the Al plated hollow member by hot forming using Al plated steel pipe not formed with a surface film layer mainly comprised of ZnO (Al plated welded pipe), the surface of the produced Al plated hollow member may be provided with the above such surface film layer mainly comprised of ZnO.

Figure 2:
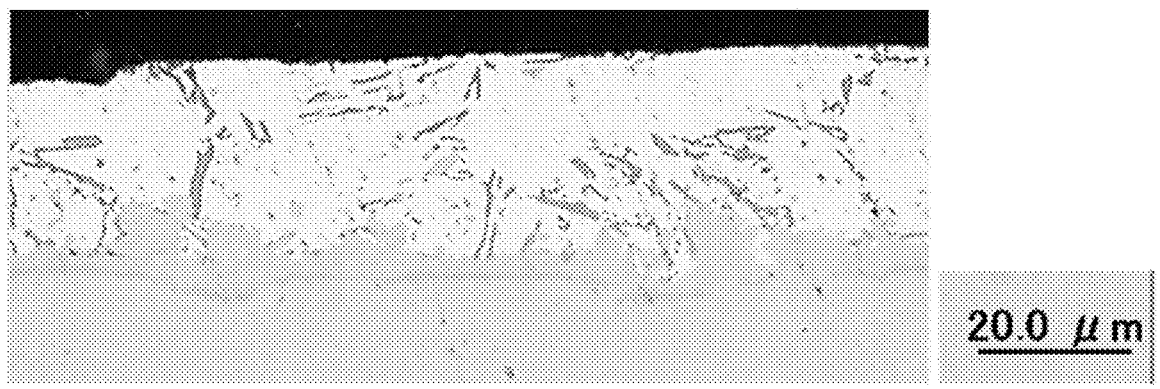
FIG. 2 is a photograph of a cross-section of an Al plating layer of an Al plated steel pipe used as the material before heating.

The rate of formation of scale in the alloy layer is defined as follows. The cross-section of the steel pipe part is buried in resin and polished, then observed under an optical microscope or SEM in a range of 0.5 mm in the circumferential direction to measure the ratio of scale in the entire structure formed with scale. The scale inside of the alloy layer is relatively coarse (for example, 5 to 20 μm width), so for example as shown in FIG. 1, can be easily measured even by observation under an optical microscope. For example, if observing a range of 0.5 mm (500 μm) under an optical microscope and there are five particles of scale of 10 μm width in that range, the rate of formation of scale is judged to be (10 μm×5 particles)/500 μm=10%. As a comparison, FIG. 2 shows a photo of the cross-section of the Al plating layer of the material Al plated steel pipe before heating.

The hardness of the portion of the steel base material of the hardened part becomes a Vickers hardness (Hv) of 350 to 800 or so. The value of the hardness substantially corresponds to the amount of C in the steel, so at an amount of C of 0.06%, the Hv becomes a maximum 350 or so, while at an amount of C of 0.5%, the Hv becomes 800 or so. Note that, the Hv can be measured in accordance with JIS Z2244.

When measuring the Hv, the vicinity of the center part of thickness of the steel plate is measured by a load of 5 kgf (1 kgf is about 9.8N).

EXAMPLES

Below, while showing test examples, Al plated welded pipe for hardening use, the method for producing a hot bent Al plated hollow member, and the Al plated hollow member according to the present invention will be explained in detail. Note that, the test examples shown below are just examples of the Al plated welded pipe for hardening use, the method for producing a hot formed Al plated hollow member, and the Al plated hollow member according to the present invention. The Al plated welded pipe for hardening use, the method for producing a hot formed Al plated hollow member, and the Al plated hollow member according to the present invention are not limited to the following examples. In particular, the hot forming may also be applied for bending, narrowing, expansion, crushing, etc.

Test Example 1

The cold rolled steel plate of the steel constituents shown in the following Table 1 (plate thickness 1.2 to 2.0 mm) was plated with Al by hot dip coating. The annealing temperature at the time of Al plating was about 800° C. The Al plating bath contained Si: 9% and in addition contained about 2% of Fe eluted from the steel strip. The amount of plating deposition after the plating was adjusted by gas wiping to 20 to 100 g/m$^2$ per side.

After cooling, some of the cold rolled steel plate was coated by a roll coater with a solution of a suspension containing ZnO of an average particle size of about 50 nm in which an acrylic-based binder was included in 20% with respect to the amount of ZnO. This was baked on at about 80° C. The amount of deposition was made, by amount of Zn, 0.1 to 1.5 g/m$^2$ per side.

[Table 1]

TABLE 1

| Steel Constituents of Test Material (unit: mass %) | | | | | | | | |
|---|---|---|---|---|---|---|---|---|
| C | Si | Mn | P | S | Ti | B | Al | N |
| 0.22 | 0.13 | 1.28 | 0.006 | 0.003 | 0.02 | 0.004 | 0.04 | 0.003 |

* Balance of Fe and impurities.

The produced Al plated steel plate was used to produce an Al plated steel pipe (Al plated welded pipe). The electric resistance welding was made high frequency welding. The frequency at the time of welding was 300 kHz, while the welding speed was made 5 m/s. The weld bead was cut, that is, a bead cut was performed, and part of the outside surface of the steel pipe was formed with an Al sprayed coating of 50 μm thickness. Steel pipes of various plate thicknesses and outside diameters were produced and evaluated for this characteristic. The method of evaluation is shown below.

(1) Cross-Sectional Structure and Plating Thickness

A cross-section of the steel pipe was polished to a mirror surface, was etched by a 2 vol % Nital solution, then was observed under an optical microscope to measure the thickness of the alloy layer (intermetallic compound layer) and the thickness of the Al plating layer. Three samples were taken in the circumferential direction of the steel pipe. A photo of the outside surface was taken by an optical microscope for each sample. The average value of the thicknesses of the alloy layer and the average value of the thicknesses of the Al plating layer for a total of six portions were calculated. For a sprayed pipe as well, similarly three samples were taken with the thickness of the sprayed coating in the longitudinal direction and the average value of the three portions was calculated.

(2) Examples of Hot Press Working

A die for forming use was placed inside of a hydraulic press. Inside, the steel pipe and heating device of the steel pipe were placed. The two ends of an 800 mm steel pipe were sealed through flanges and nitrogen gas was introduced to the inside surface. In that state, high frequency heating was used to raise the steel pipe to a temperature of 900° C. The high frequency heating was performed by making an induction coil move from one side of the steel pipe to the opposite side. After heating, the coil was conveyed outside of the die, then a press was used to form the pipe. The atmosphere at the time of heating was made the air. The speed of conveyance of the induction coil was controlled to change the rate of temperature rise (average rate of temperature rise) of the steel pipe.

The shape formed was made simply the steel pipe minus ½ thickness (diameter in vertical direction) and the part hardened in the die. The weld bead at this time was arranged so as to come at the top surface. After that, a sample was taken from the formed article. The cross-section was polished and a 2 vol % Nital etching solution was used to expose the structures of the steel and plating layer. At this time, there are samples with scale mainly comprised of FeO inside the Al—Fe layer. The rate of formation of scale was observed and evaluated in accordance with the above method. Further, each sample formed with a decarburized layer was measured for thickness of the decarburized layer. The criteria for evaluation was as follows. Further, from the cross-section of each sample, the Hv: Vickers hardness was measured by a load of 5 kgf by the method prescribed in JIS Z2244.

G: Rate of formation of scale—none (0%)
F: Rate of formation of scale of 1 to 5%
P: Rate of formation of scale of over 5% and decarburized layer of 3 μm or more (3) Sprayed Coating Adhesion After spraying Al, the adhesion of the sprayed part was evaluated. The evaluation was performed by taping. The following criteria was used for evaluation. Specifically, commercially available cellophane tape was applied to each sample and the applied cellophane tape was peeled off. Whether or not any peeling occurred at the sprayed part at that time was used for evaluation.

G: No peeling
F: Within 1 mm diameter peeled off
P: Over 1 mm peeled off (4) Coating Adhesion From a steel pipe test piece after hot forming, a portion containing the weld bead was cut out and evaluated for coating adhesion. The chemical conversion was performed using a phosphating solution made by Nihon Parkerizing (PB-SX35), while the cataphoretic painting was performed by coating an electrodeposition coating made by Nippon Paint (Powernix 110) aiming at 15 μm and baking it on at 170° C.

As evaluation of the coating adhesion, the sample was immersed in a 50° C. 5% salt water for 480 hours, taken out, then cross cut to a grid of 1 mm squares by a cutter, then taped. The state of peeling at this time was evaluated by the following criteria.

G: No peeling
F: 3 squares or less peeled off
P: 4 squares or more peeled off or peeling without regard to squares (5) Adhesion in Salt Dip Test The above chemically converted and cataphoretic painted sample was immersed in 50° C. 5% salt water for 2 weeks without introducing a defect into the coating. Within one hour after immersion, the surface was cross cut to a grid of 1 mm squares, then the surface was taped to evaluate the coating adhesion. The evaluation was evaluation much severer than the adhesion shown in (4). Normally, such severe coating adhesion is not required, but is a characteristic required at the time of use in particularly severe corrosive environments.

G: No peeling
F: 3 squares or less peeled off
P: 4 squares or more peeled off or peeling without regard to squares The evaluated levels and results of evaluation at this time are shown together in the following Table 2.

TABLE 2

| No. | Al plating thickness (μm) | Intermetallic compound layer thickness (μm) | Plate thickness (mm) | Pipe outside diameter (mm) | t/D (%) | 70× (X/D) | Y/t | Y/X | Film treatment | Weld zone spraying | Cross-sectional structure after hot pressing |
|---|---|---|---|---|---|---|---|---|---|---|---|
| 1 | 16 | 2.5 | 2.0 | 24 | 8.3 | 7.3 | 8.0 | 6.4 | None | Yes | F |
| 2 | 16 | 4.5 | 2.0 | 24 | 8.3 | 13.1 | 8.0 | 3.6 | None | Yes | P |
| 3 | 16 | 2.5 | 2.0 | 32 | 6.3 | 5.5 | 8.0 | 6.4 | None | Yes | G |
| 4 | 30 | 5.0 | 2.0 | 32 | 6.3 | 10.9 | 15.0 | 6.0 | None | Yes | F |
| 5 | 30 | 5.0 | 1.2 | 32 | 3.8 | 10.9 | 25.0 | 6.0 | None | Yes | G |
| 6 | 24 | 6.0 | 2.0 | 32 | 6.3 | 13.1 | 12.0 | 4.0 | None | Yes | P |
| 7 | 32 | 5.0 | 2.0 | 24 | 8.3 | 14.6 | 16.0 | 6.4 | ZnO 0.2 g/m² | Yes | F |
| 8 | 32 | 5.0 | 2.0 | 24 | 8.3 | 14.6 | 16.0 | 6.4 | ZnO 0.6 g/m² | Yes | G |
| 9 | 32 | 5.0 | 2.0 | 24 | 8.3 | 14.6 | 16.0 | 6.4 | ZnO 0.4 g/m² | Yes | G |
| 10 | 32 | 5.0 | 2.0 | 24 | 8.3 | 14.6 | 16.0 | 6.4 | None | Yes | F |
| 11 | 32 | 5.0 | 2.0 | 24 | 8.3 | 14.6 | 16.0 | 6.4 | None | Yes | G |
| 12 | 32 | 5.0 | 2.0 | 24 | 8.3 | 14.6 | 16.0 | 6.4 | None | Yes | G |
| 13 | 24 | 5.0 | 2.0 | 48 | 4.2 | 7.3 | 12.0 | 4.8 | None | Yes | G |
| 14 | 16 | 4.0 | 2.0 | 32 | 6.3 | 8.8 | 8.0 | 4.0 | None | Yes | P |
| 15 | 16 | 4.0 | 1.6 | 32 | 5.0 | 8.8 | 10.0 | 4.0 | None | Yes | F |
| 16 | 16 | 4.0 | 1.0 | 32 | 3.1 | 8.8 | 16.0 | 4.0 | None | Yes | G |
| 17 | 32 | 5.0 | 1.6 | 32 | 5.0 | 10.9 | 20.0 | 6.4 | ZnO 0.8 g/m² | Yes | G |
| 18 | 32 | 5.0 | 1.6 | 32 | 5.0 | 10.9 | 20.0 | 6.4 | ZnO 1.0 g/m² | Yes | G |
| 19 | 32 | 5.0 | 1.6 | 32 | 5.0 | 10.9 | 20.0 | 6.4 | None | None | G |
| 20 | 16 | 2.5 | 2.0 | 32 | 6.3 | 5.5 | 8.0 | 6.4 | None | Yes | F |
| 21 | 30 | 5.0 | 2.0 | 36 | 5.6 | 9.7 | 15.0 | 6.0 | None | Yes | G |
| 22 | 22 | 5.0 | 2.0 | 32 | 6.3 | 10.9 | 11.0 | 4.40 | None | Yes | F |
| 23 | 23 | 5.0 | 1.6 | 32 | 5.0 | 10.9 | 14.4 | 4.6 | None | Yes | F |

| No. | Speed of temperature elevation (° C./s) | α | Y/t | Sprayed coating adhesion | Coating adhesion | Adhesion in salt dip test | Hardness Hv | Rate of scale formation (%) | Remarks |
|---|---|---|---|---|---|---|---|---|---|
| 1 | 7 | 70.0 | 8 | G | G | G | 510 | 3 | Inv. ex. |
| 2 | 7 | 70.0 | 8 | G | G | G | 474 | 15 | Comp. ex. |
| 3 | 7 | 70.0 | 8 | G | G | G | 466 | 0 | Inv. ex. |
| 4 | 7 | 70.0 | 15 | G | G | G | 502 | 1 | Inv. ex. |
| 5 | 7 | 70.0 | 25 | G | G | G | 480 | 0 | Inv. ex. |
| 6 | 7 | 70.0 | 12 | G | G | G | 488 | 10 | Comp. ex. |
| 7 | 25 | 39.5 | 16 | G | G | G | 491 | 3 | Inv. ex. |
| 8 | 50 | 28.9 | 16 | G | G | G | 462 | 0 | Inv. ex. |
| 9 | 100 | 21.1 | 16 | G | G | G | 469 | 0 | Inv. ex. |
| 10 | 25 | 39.5 | 16 | G | G | F | 442 | 3 | Inv. ex. |
| 11 | 50 | 28.9 | 16 | G | G | F | 475 | 0 | Inv. ex. |
| 12 | 100 | 21.1 | 16 | G | G | F | 439 | 0 | Inv. ex. |
| 13 | 7 | 70.0 | 12 | G | G | G | 481 | 0 | Inv. ex. |
| 14 | 7 | 70.0 | 8 | G | G | G | 467 | 11 | Comp. ex. |
| 15 | 7 | 70.0 | 10 | G | G | G | 470 | 2 | Inv. ex. |
| 16 | 7 | 70.0 | 16 | G | G | G | 457 | 0 | Inv. ex. |
| 17 | 7 | 70.0 | 20 | G | G | G | 463 | 0 | Inv. ex. |
| 18 | 7 | 70.0 | 20 | G | G | G | 458 | 0 | Inv. ex. |
| 19 | 7 | 70.0 | 20 | — | G | G | 471 | 0 | Inv. ex. |
| 20 | 2 | 123.0 | 8 | G | G | G | 492 | 4 | Inv. ex. |
| 21 | 10 | 59.6 | 15 | G | G | G | 477 | 0 | Inv. ex. |
| 22 | 7 | 70.0 | 11 | G | G | G | 501 | 4 | Inv. ex. |
| 23 | 3 | 102.5 | 14.4 | G | G | G | 488 | 4 | Inv. ex. |

As clear from the above Table 2, if observing the state of formation of scale from a cross-section after hot press working, if satisfying 70×X/D≤Y/t≤30 and Y/X is α-times t/D or more, the formation of scale was slight or not seen at all. The state of formation of scale also depends on the rate of temperature rise. It became clear that by making the rate of temperature rise larger, the formation of scale tends to be mitigated. Further, it became clear that by giving the Al plating surface a film containing ZnO, in particular the coating adhesion according to a salt dip test is improved. Further, as clear from Table 2, the hardnesses (Hv) of the steel base materials of the samples corresponding to the invention examples were all values between 450 to 530.

Test Example 2

Steel plate of a plate thickness of 1.4 mm having each of the steel constituents shown in the following Table 3 was plated with Al under conditions similar to Example 1. The thickness of the Al plating layer was 24 μm, while the thickness of the alloy layer was 5 μm. The steel plate was formed into steel pipe of an outside diameter of 32 mm and sprayed with about 30 μm of Al at the welded zone. After that, the adhesion of the sprayed material was evaluated as shown in Example 1.

TABLE 3

| Symbol | C | Si | Mn | P | S | Al | O | N | Ti | B | Nb | V | Cr | Mo | Ni | Cu | Ca | REM |
|---|---|---|---|---|---|---|---|---|---|---|---|---|---|---|---|---|---|---|
| A | 0.22 | 0.13 | 1.22 | 0.005 | 0.003 | 0.03 | 0.002 | 0.003 | 0.02 | 0.0040 | | | 0.15 | | | | | |
| B | 0.23 | 0.11 | 1.26 | 0.012 | 0.002 | 0.02 | 0.001 | 0.004 | 0.03 | 0.0030 | | | 0.15 | | | | | |
| C | 0.20 | 0.10 | 1.11 | 0.007 | 0.002 | 0.13 | 0.003 | 0.003 | 0.02 | 0.0050 | | | 0.14 | | | | | |
| D | 0.22 | 0.09 | 1.19 | 0.006 | 0.003 | 0.03 | 0.002 | 0.013 | 0.02 | 0.0050 | | | 0.14 | | | | | |
| E | 0.25 | 0.11 | 1.67 | 0.005 | 0.006 | 0.03 | 0.004 | 0.005 | 0.02 | 0.0030 | | | | | | | | |
| F | 0.19 | 0.22 | 1.45 | 0.008 | 0.004 | 0.04 | 0.005 | 0.003 | 0.03 | 0.0010 | | | 0.16 | | | | | |
| G | 0.24 | 0.26 | 1.39 | 0.007 | 0.005 | 0.04 | 0.003 | 0.004 | 0.04 | 0.0040 | | | 0.3 | | | | | |
| H | 0.28 | 0.07 | 1.09 | 0.002 | 0.010 | 0.03 | 0.002 | 0.002 | 0.05 | 0.0020 | | | 0.17 | | | | | |
| I | 0.48 | 0.42 | 2.90 | 0.003 | 0.040 | 0.02 | 0.002 | 0.005 | 0.10 | | 0.09 | 0.27 | | | | | | |
| J | 0.35 | 0.78 | 0.65 | 0.002 | 0.002 | 0.04 | 0.001 | 0.008 | 0.05 | 0.0035 | | | 0.48 | 0.45 | 0.46 | | | |
| K | 0.07 | 0.38 | 1.50 | 0.004 | 0.008 | 0.09 | 0.002 | 0.015 | 0.04 | 0.0004 | | | | | | 0.46 | 0.004 | 0.002 |

* Balance of Fe and impurities.
* Empty fields indicate not contained.

As a result, for symbols B to D, peeling of the sprayed material was observed. From these results, it became clear that reducing P, Al, and N as steel constituents is preferable. Peeling of the sprayed material could not be recognized for other conditions.

Further, the steel pipes were hot press worked under conditions similar to Example 1 (rate of temperature rise of 10° C./s) and evaluated in the same way as Example 1. As a result, results of evaluation corresponding to "G" were obtained for both of the cross-sectional structure and coating adhesion after hot press working.

Above, preferred embodiments of the present invention were explained in detail, but the present invention is not limited to these embodiments. It is clear that a person having ordinary knowledge in the technical field to which the present invention belongs could conceive of various changes or corrections within the scope of the technical idea described in the claims. These are also naturally understood as falling in the technical scope of the present invention.

INDUSTRIAL APPLICABILITY

If using the Al plated welded pipe for hardening use of the present invention, it becomes possible to produce high strength member by hot forming and possible to obtain a part lighter than in the past. Due to this, it is possible to contribute to further lighter weight in the automobile etc. of the final application.

The invention claimed is:

1. An Al plated electric resistance welded steel pipe for hardening use comprising a base material made of a tubular steel plate and an electric resistance welded zone provided at a seam portion of the steel plate and extending in a longitudinal direction of the steel plate, the base material comprising, by mass %,
C: 0.06 to 0.50%,
Si: 0.01 to 0.80%,
Mn: 0.60 to 3.00%,
P: 0.050% or less,
S: 0.050% or less,
Al: 0.10% or less,
O: 0.006% or less,
N: 0.020% or less,
Ti: 0.01 to 0.10%,
B: 0 to 0.1000%,
Nb: 0 to 0.10%,
V: 0 to 0.30%,
Cr: 0 to 0.50%,
Mo: 0 to 0.50%,
Ni: 0 to 0.50%,
Cu: 0 to 0.50%,
Ca: 0.0 to 0.005%,
REM: 0 to 0.005% and
a balance of Fe and impurities,
the base material comprising
an intermetallic compound layer positioned on the surface of the steel plate and including an Al—Fe—Si-based intermetallic compound and
an Al plating layer positioned on the surface of the intermetallic compound layer and containing Al and Si,
wherein $$70 \times X/D \le Y/t \le 30$$

$$2\% \le t/D \le 10\%,$$

$$20 \text{ mm} \le D \le 70 \text{ mm}$$

$$X \le 5.0, Y \le 32, \text{ and}$$

$$4.0 \le Y/X \le 6.0$$

are satisfied, wherein X (μm) is a thickness of the intermetallic compound layer, Y (μm) is a thickness of the Al plating layer, t (mm) is a pipe thickness of the steel pipe, and D (mm) is an outside diameter of the steel pipe.

2. The Al plated electric resistance welded steel pipe for hardening use according to claim 1, wherein the surface of the Al plating layer is further provided with a film comprised of ZnO and the amount of deposition of the film is, by amount of Zn, 0.1 to 1 g/m$^2$.

3. The Al plated electric resistance welded steel pipe for hardening use according to claim 1 wherein the welded zone is covered by an alloy comprised of Al.

4. The Al plated electric resistance welded steel pipe for hardening use according to claim 2 wherein the welded zone is covered by an alloy comprised of Al.

* * * * *